United States Patent
Boz et al.

(10) Patent No.: US 6,868,468 B2
(45) Date of Patent: Mar. 15, 2005

(54) SWITCHABLE HOT-DOCKING INTERFACE FOR A PORTABLE COMPUTER FOR HOT-DOCKING THE PORTABLE COMPUTER TO A DOCKING STATION

(75) Inventors: Richard H. Boz, Huntington Station, NY (US); Ronald W. Streiber, Smithtown, NY (US); John D. Virzi, Bayside, NY (US); Richard E. Wahler, St. James, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 405 days.

(21) Appl. No.: 10/076,105

(22) Filed: Feb. 14, 2002

(65) Prior Publication Data

US 2003/0154338 A1 Aug. 14, 2003

(51) Int. Cl.[7] ........................... G06F 13/00; G06F 13/14
(52) U.S. Cl. ...................... 710/304; 710/306; 710/316
(58) Field of Search .......................... 710/301, 62, 104, 710/316, 304, 302, 300, 305, 306, 313, 303; 361/683, 686; 709/250, 253; 712/32, 38

(56) References Cited

U.S. PATENT DOCUMENTS

| | | |
|---|---|---|
| 5,598,537 A | 1/1997 | Swanstrom et al. |
| 5,598,539 A | 1/1997 | Gephardt et al. |
| 5,632,020 A | 5/1997 | Gephardt et al. |
| 5,768,541 A | 6/1998 | Pan-Ratzlaff |
| 5,781,744 A | 7/1998 | Johnson et al. |
| 5,781,747 A | 7/1998 | Smith et al. |
| 5,798,951 A | 8/1998 | Cho et al. |
| 5,862,349 A | 1/1999 | Cho et al. |
| 5,873,000 A | 2/1999 | Lin et al. |
| 5,884,049 A | 3/1999 | Atkinson |
| 5,889,964 A | 3/1999 | Cho et al. |
| 5,892,930 A | 4/1999 | Kenny et al. |
| 5,892,931 A | 4/1999 | Cohen et al. |
| 5,901,292 A | 5/1999 | Nishigaki et al. |
| 5,933,609 A | 8/1999 | Walker et al. |
| 5,987,545 A | 11/1999 | Oh |
| 5,999,997 A | 12/1999 | Pipes |

(List continued on next page.)

FOREIGN PATENT DOCUMENTS

JP          10-3106115          10/1999

OTHER PUBLICATIONS

"A router architecture for real-time communication in multicomputer networks" by Rexford, J.; Hall, J.; Shin, K.G. (abstract only).*

"Switching Plan for a cellular Mobile Teleohone System" by Fluhr, Z.; Nussbaum, E. (abstract only).*

International Search Report, Patent Application PCT/US03/04433, mailed Sep. 12, 2003.

Primary Examiner—Gopal C. Ray
(74) Attorney, Agent, or Firm—Meyertons Hood Kivlin Kowert & Goetzel, P.C.; Jeffrey C. Hood; Erik A. Heter

(57) ABSTRACT

A method and apparatus for hot-docking is disclosed. In one embodiment, a portable computer system includes a bus bridge and a bus coupled to the bus bridge. The bus may have one or more peripheral devices or peripheral interfaces coupled to it. The bus may also be coupled to a docking interface having a bus switch. The bus switch, when closed and the computer is coupled to a docking station, may couple the bus to a peripheral interface in a docking station. The bus switch may close responsive to docking, thereby completing the electrical coupling of the bus to the peripheral interface in the docking station. The closing of the bus switch may be controlled by the docking interface such that operations on the bus are not interrupted during the docking procedure.

92 Claims, 5 Drawing Sheets

U.S. PATENT DOCUMENTS

| | | |
|---|---|---|
| 6,070,214 A | 5/2000 | Ahern |
| 6,088,752 A | 7/2000 | Ahern |
| 6,098,132 A | 8/2000 | Olarig et al. |
| 6,154,796 A | 11/2000 | Kuo et al. |
| 6,154,798 A | 11/2000 | Lin et al. |
| 6,161,157 A | 12/2000 | Tripathi et al. |
| 6,212,590 B1 | 4/2001 | Melo et al. |
| 6,216,185 B1 | 4/2001 | Chu |
| 6,247,079 B1 | 6/2001 | Papa et al. |
| 6,304,929 B1 | 10/2001 | Wallach et al. |
| 6,336,158 B1 * | 1/2002 | Martwick ............ 701/104 |
| 6,418,492 B1 | 7/2002 | Papa et al. |
| 6,460,106 B1 | 10/2002 | Stufflebeam |
| 6,493,782 B1 | 12/2002 | Verdun et al. |
| 6,519,669 B1 | 2/2003 | Yanagisawa |
| 6,725,320 B1 * | 4/2004 | Barenys et al. ......... 710/316 |
| 2002/0038400 A1 | 3/2002 | Fukushima |

* cited by examiner

SWITCHABLE HOT-DOCKING INTERFACE FOR A PORTABLE COMPUTER FOR HOT-DOCKING THE PORTABLE COMPUTER TO A DOCKING STATION

BACKGROUND OF THE INVENTION

1. Field of the Invention

This invention relates to computer systems, and more particularly, to portable computer systems that may be coupled to a docking station.

2. Description of the Related Art

Portable computers enjoy widespread popularity. Advances in computer technology, such as faster processors with low power consumption, have led to portable computer systems that are comparable to desktop computers in performance. Because of these improvements, portable computers are an ideal solution for a user that needs a large amount of computing power as well as a mobile platform.

Despite the performance increases, portable computers still are at a disadvantage relative to other computers. In particular, due to their small size, portable computers typically are not able to offer as much functionality as stationary computers, as a limited number of interfaces are present. One solution to this problem is a docking station. A docking station may allow for increased functionality when the portable computer is coupled to it. Through a docking station, a portable computer may be able to utilize the functionality of such devices as a full-screen monitor, additional printers, scanners, and so forth.

Although docking stations are a convenient solution to providing additional functionality for a portable computer, coupling the portable computer to a docking station poses its own set of problems. In some portable computers, it is necessary to either remove power or suspend power prior to coupling to the docking station. In other computers, operations must be suspended even if power is not removed. Thus, a user of a portable computer may not always be able to conduct a true "hot-docking" with a docking port.

SUMMARY OF THE INVENTION

A method and apparatus for hot-docking a portable computer to a docking station is disclosed. In one embodiment, the portable computer system includes a bus bridge and a bus coupled to the bus bridge. One or more peripheral devices or peripheral interfaces may be coupled to the bus. The bus may also be coupled to a docking interface. The docking interface may be an integrated circuit having a bus switch. The docking interface may be adapted to couple the bus to a peripheral interface in the docking station. When the bus switch is closed, after the computer is coupled to the docking station, the bus may be coupled to the peripheral interface, via a docking connector in the portable computer and a complementary connector in the docking station. The bus switch may close responsive to the docking, thereby completing the electrical coupling of the bus to the peripheral interface in the docking station. The closing of the bus switch may be controlled by the docking interface such that operations on the bus are not suspended during docking operations.

In one embodiment, the bus may be a low pin count (LPC) bus. The bus switch may be a low on-resistance, high off-resistance bi-directional switch that may close to electrically couple the LPC bus to the docking connector. The docking station may include a complementary connector configured to be coupled to the docking connector of the portable computer. The complementary connector in the docking station may be electrically coupled to at least one peripheral interface. When the portable computer is connected to the docking station, a dock detect signal may be asserted and received by the docking interface. The docking interface may then initiate a sequence of events that result in the bus switch closing, thereby connecting the bus in the portable computer to the peripheral interface in the docking station. The sequence of events that results in the closing of the bus switch may be performed without suspending operations on the bus.

A method for hot-docking the portable computer to the docking station may include a user physically coupling the portable computer to the docking station. The physical coupling may result in the assertion of a dock detect signal, and electrically coupling the bus to the peripheral interface in the docking station by closing the bus switch. A docking interface chip including the bus switch is also contemplated.

It should be noted that bus types other than the LPC bus are possible and contemplated for the method and apparatus described herein. Other types of buses may include, but are not limited to, a peripheral component interconnect (PCI) bus, an industry standard architecture or extended industry standard architecture (ISA/EISA) bus, universal serial bus (JSB), general purpose instrument bus (GPIB), advanced graphics port (AGP), and so forth.

BRIEF DESCRIPTION OF THE DRAWINGS

Other aspects of the invention will become apparent upon reading the following detailed description and upon reference to the accompanying drawings in which.

Figure 1:
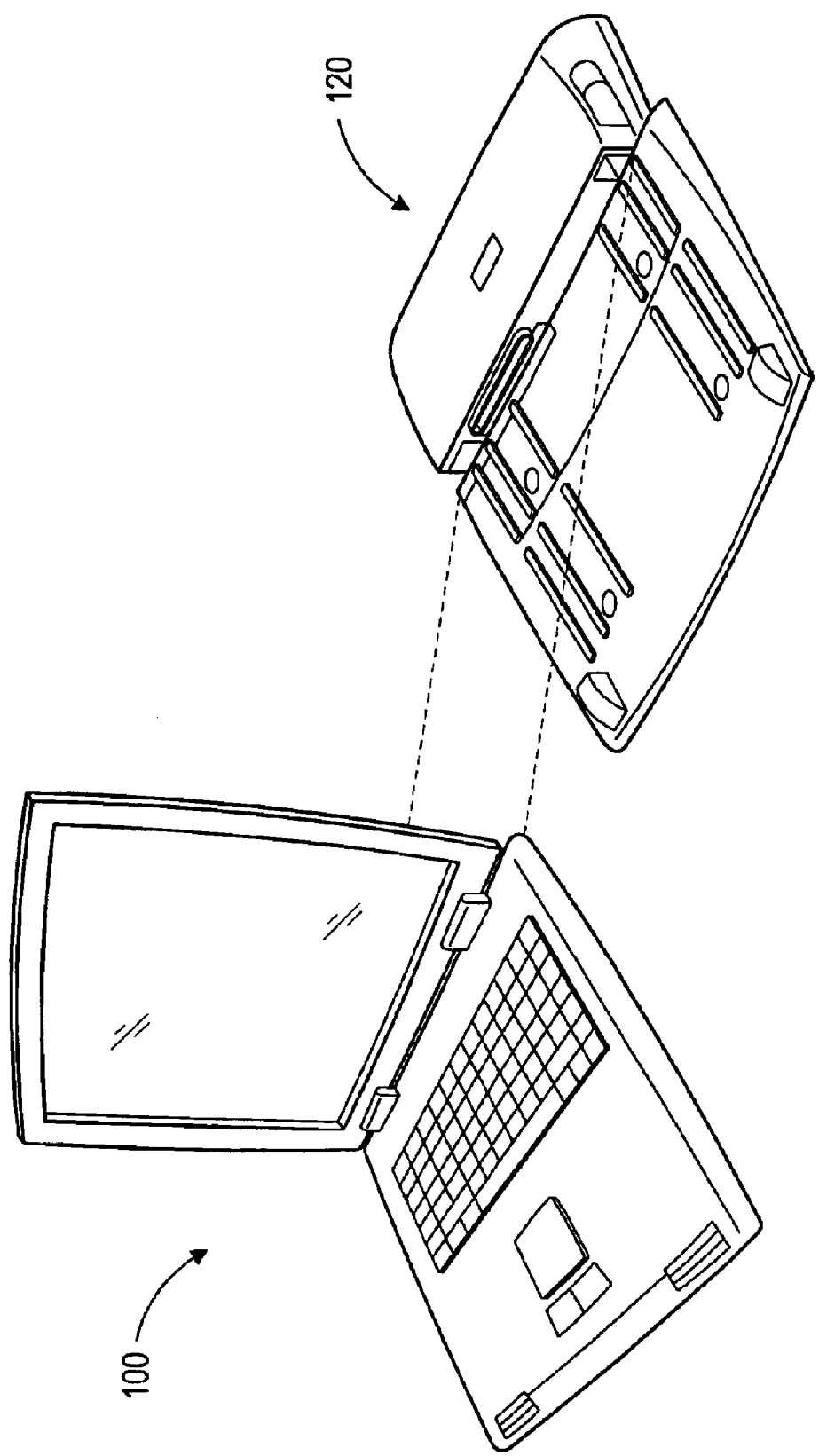
FIG. 1 is a drawing illustrating one embodiment of a portable computer and a docking station.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

The Intel® LPC Interface Specification, Revision 1.0, Sep. 29, 1997, is incorporated by reference herein in its entirety.

FIG. 1 is a drawing of one embodiment of a portable computer and a docking station. Portable computer 100 may be one of many different types of portable computers (i.e. laptops, notebooks, etc.). Furthermore, it is possible and contemplated that portable computer 100 may be another type of device, such as a personal digital assistant (PDA).

Docking station 120 may provide additional functionality to portable computer 100. Docking station 120 may include connections for a full-size keyboard, a monitor, a printer, and various other peripheral devices. Docking station may be able to provide the use of a full-size keyboard and monitor display when portable computer 100 is coupled to docking station 120. Various types of peripheral bus interfaces may be employed, including universal serial bus (USB), peripheral component interconnect (PCI), and so on. Through the various interfaces in both portable computer 100 and docking station 120, the use of various devices such as flat-bed and feed-through scanners, high capacity disk drives (e.g. a ZIP drive), network interfaces, printers, joysticks, a trackball or mouse, and many other devices may be employed. Although portable computer 100 may include some of the same types of interfaces as docking station 120, the docking station may provide additional interfaces, thereby expanding the functionality of the portable computer.

Portable computer 100 may be configured for hot-docking to docking station 120. Hot-docking may be defined here as coupling portable computer 100 to docking station 120 without an interruption in power. In the embodiment shown, it may be unnecessary to power down or suspend power to portable computer 100 when coupling it to docking station 120. Furthermore, portable computer 100 may be configured to continue operations without interruption during hot-docking operations. Continuing operations may include transactions on a bus that is configured to be electrically coupled to docking station 120 as a result of hot-docking operations. Thus, operations on a bus in portable computer 100 may continue uninterrupted even when the bus is being electrically coupled to docking station.

Portable computer 100 may be further configured to be undocked from docking station 120 without removing power. Bus transactions within portable computer 100 may continue uninterrupted during undocking operations, even after communications with docking station 120 have been terminated. Docking station 120 may be powered down responsive to the undocking.

Figure 2:
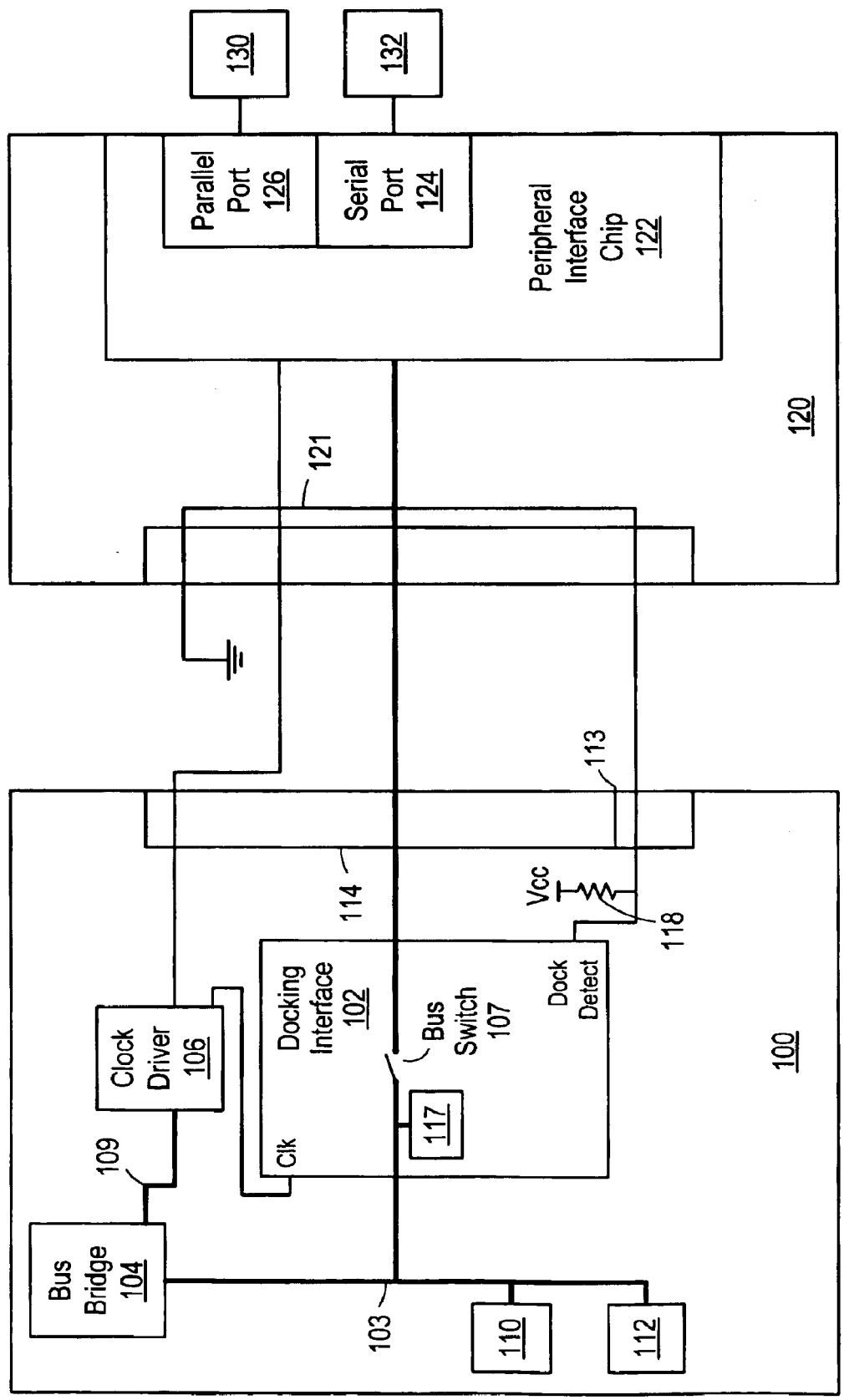
FIG. 2 is a block diagram of one embodiment of a portable computer system and a docking station, wherein the portable computer system is configured for hot-docking.

Turning now to FIG. 2, a block diagram is shown of one embodiment of a portable computer system and a docking station, wherein the portable computer system is configured for hot-docking. As with FIG. 1, portable computer 100 is configured for hot-docking to docking station 120. Portable computer 100 may include bus bridge 104 and docking interface 102, which are coupled to each other via bus 103. Bus 103 may be a low pin count (LPC) bus in one embodiment, although other embodiments are possible and contemplated. As noted above, the Intel® LPC Interface Specification, Revision 1.0, Sep. 29, 1997, is incorporated by reference herein in its entirety. Other possible bus types may include a peripheral component interconnect (PCI) bus, an industry standard architecture/extended industry standard architecture (ISA/EISA) bus, an advanced graphic port (AGP) bus, a universal serial bus (USB), a general purpose instrument bus (GPIB) or other type.

Bus 103 may also be coupled to peripheral interfaces 110 and 112. Peripheral interfaces may allow devices to be coupled to portable computer 100, and in some cases, may be devices that are actual components of portable computer 100. Such devices may include, but are not limited to, disk drives, modems, network interfaces, and so on. Bus 103 may allow peripheral interfaces 110 and 112 to communicate with a processor (not shown) and a memory system (not shown) in portable computer 100. It should be noted that the portion of the bus that is actually coupled to the docking station (to the right of the switch in the drawing) may be referred to as a switched bus.

Computer system 100 also includes clock driver 106. Clock driver 106 may be coupled to bus bridge 104 by utility bus 109. Bus bridge 104 may send commands over utility bus 109 to clock driver 106 to enable or disable the clock driver outputs. In the embodiment shown, clock driver 106 has two clock outputs, one for driving a clock signal to docking interface 102 and one for driving a clock signal to docking station 120. Additional clock outputs for driving clock signals to other devices in portable computer system may also be present.

Portable computer 100 includes docking connector 114, which is configured to be coupled to complementary connector 121 in docking station 120. When coupled together, docking connector 114 and complementary connector 121 provide physical and electrical connections between portable computer 100 and docking station 120. At least one signal path through docking connector 114 is configured to provide a dock detect signal to docking interface 102. In the embodiment shown, the dock detect signal is asserted in a logic low state. The dock detect signal may normally be pulled to a logic high state by resistor 118, which is coupled to a power node in portable computer 100. When portable computer 100 is docked to docking station 120, the signal line associated with the dock detect signal may be coupled to a ground node, thereby causing the dock detect signal to be asserted in a logic low state. Other embodiments are possible and contemplated wherein the dock detect signal is asserted in a logic high state, and/or wherein a pull-up or pull down resistor is in docking station 120.

Docking connector 114 may also include power pin 113. In some embodiments, docking station 120 may be configured to receive power from portable computer 100. In the embodiment shown, power pin 113 provides a path for power from a power node of portable computer 100 to docking station 120. In some embodiments, multiple power pins may be present, as well as corresponding multiple ground pins. In other embodiments, docking station 120 may receive power from an external source separate from portable computer 100. In such embodiments, power pin 113 may be used to convey a signal to initiate a power-up sequence in docking station 120. Additional embodiments are possible and contemplated wherein the mere act of coupling portable computer 100 to docking station 120 causes power-up sequence to be executed in docking station 120. The power-up sequence may turn on power received from portable computer 100, or power received from another external source.

As previously noted, docking interface 102 is configured to receive a dock detect signal. When docking interface 102 detects an assertion of the dock detect signal, it may begin operations to electrically couple bus 103 to peripheral interface chip 122 in docking station 120. In the embodiment shown, peripheral interface chip 122 is a single chip with multiple interfaces. Other embodiments are possible and contemplated wherein multiple interface chips are present (and configured to be coupled to bus 103 when portable computer 100 is docked to docking station 120). Furthermore, such interface chips may include a single interface or multiple interfaces. In the embodiment shown, peripheral interface chip 122 includes serial port 124 and parallel port 126. Serial port 124 is shown here as being coupled to peripheral device 132, while parallel port 126 is shown here as being coupled to peripheral device 130.

Docking interface 102 includes bus switch 107 and switch control circuit 117. In one embodiment, bus switch 107 is a low on-resistance, high off-resistance bi-directional switch. Switch control circuit 117 may include a translation circuit for translating various bus commands into open and close commands for bus switch 107. In one embodiment, switch control circuit 117 may receive 'write' commands via bus 103. These commands may be translated by the translation circuit in switch control circuit to an open or close command. Switch control circuit 117 may open or close bus switch 107 depending upon the command received.

When docking interface 102 detects an assertion of the dock detect signal, it may initiate a sequence of events that result in the closing of bus switch 107. This sequence of events may include docking interface 102 communicating with bus bridge 104 to indicate that computer system 100 is coupled to docking station 120. Such communication may be performed over bus 103, or, in other embodiments, over separate signal lines that couple docking interface 102 to bus bridge 104. Bus bridge 104 may respond by forwarding one or more commands to the translations circuit within switch control circuit 117. These commands may be translated and may cause switch control circuit 117 to close bus switch 107. The commands may include timing and/or other information that allows the closing of bus switch 107 to be precisely timed. In order to ensure the proper timing, clock driver circuit 106 may begin driving a clock signal to docking station 120. This may allow for proper synchronization of transactions occurring between portable computer 100 and docking station 120 following the closing of bus switch 107 and subsequent utilization of docking station peripherals by portable computer 100. The closing of bus switch 107 may be performed in such a manner as to prevent or minimize electrical transients on bus 103. Precise control of the closing of bus switch 107 by switch control circuit 117 may allow the switch to be closed without any significant disturbance to current traffic on bus 103 (e.g. a transaction between bus bridge 104 and peripheral interface 110).

When bus switch 107 is closed, bus 103 may be electrically coupled to peripheral interface chip 122 in docking station 120. This may allow portable computer 100 to take advantage of the extra functionality provided by docking station 102. With bus switch 107 closed, bus bridge 104 may have a communications link to peripheral interface chip 122, and hence any peripheral devices coupled to it (e.g. peripheral devices 130 and 132).

Docking interface 102 may be further configured to initiate undocking procedures when it is desired to undock portable computer 100 from docking station 120. The initiation of undocking procedures may be a result of an input from a user of portable computer 100. For example, a user may select an "eject" option from a start menu of an operating system running on computer 100. This may eventually cause commands to be sent to the translation circuit in switch control circuit 117. Pending transactions between docking station 120 and portable computer 100 may be allowed to complete in some instances, or may be terminated in other instances. Once all transactions have been completed or terminated, switch control circuit 117 may open bus switch 107, thereby disconnecting bus 103 from peripheral interface 122 in docking station 120. It should be noted that the timing of events related to opening bus switch 107 may be similar or identical to the timing necessary for closing the switch.

Figure 3:
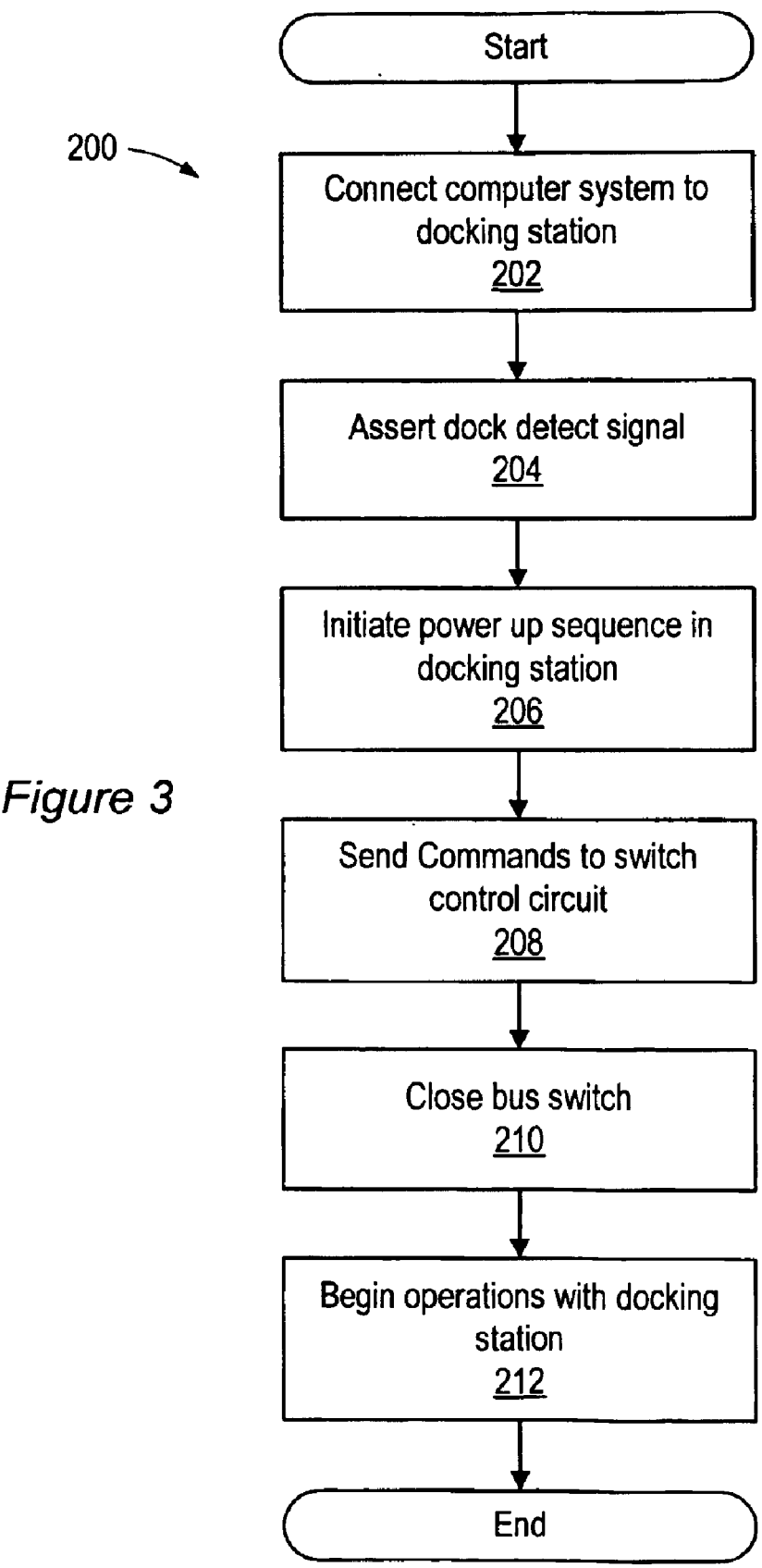
FIG. 3 is a flow diagram illustrating one embodiment of a method for hot-docking a portable computer to a docking station.

Moving now to FIG. 3, a flow diagram illustrating one embodiment of a method for hot-docking a portable computer to a docking station is shown. Method 200 may allow a portable computer to be coupled to a docking station, such as portable computer 100 and docking station 120 of FIGS. 1 and 2. It should be noted that other embodiments including a greater or lesser number of items, or different item, are possible and contemplated.

The method may begin with item 202, wherein a portable computer is physically coupled to the docking station. The physical coupling of a portable computer to a docking station includes the coupling of a connector on the portable computer to a complementary connector on a docking station. This may provide the physical/electrical connections that are necessary in order for the portable computer to utilize the extra functionality provided by the docking station. When the portable computer system is coupled to the docking station, a dock detect signal may be asserted (item 204). The dock detect signal may be received by the portable computer. In one embodiment, the dock detect signal may be received by a docking interface such as docking interface 102 of FIG. 2. When received by the docking interface or other device, the portable computer may initiate a sequence of events that allows it to become functionally coupled to the docking station.

Following the assertion and detection of the dock detect signal, a power up sequence in the docking station may be initiated (item 206). The power up sequence may include the portable computer supplying power to the docking station in some embodiments, while other embodiments may include the docking station receiving power from another external source. It should be noted that, in some embodiments, the docking station may be powered up prior to docking, and thus no power up sequence may be necessary. When the docking station is fully powered up, it may assert a signal to indicate that it has been powered up successfully (i.e. a 'power ok' signal). The signal may be received by the portable computer, which may begin other operations in order to initialize bus connections with the docking station, thereby allowing the portable computer to utilize additional peripheral functions.

Initializing bus connections between the portable computer and the docking station may include sending commands to a switch control circuit (item 208). Using the example shown in FIG. 2, switch control circuit 117 may be configured to receive command from bus bridge 104. More particularly, bus bridge 104 may be configured to send commands to a translation circuit within switch control circuit 117. The commands may cause the switch control circuit to close a bus switch (item 210). The closing of the bus switch may be timed such that any transactions occurring on the bus are not significantly disturbed by the closing of the switch. Thus, again using FIG. 2 as an example, a transaction on bus 103 between peripheral device 110 and bus bridge 104 may continue even during the closing of switch 107.

As previously noted, in one embodiment, the bus may be an LPC bus. The LPC bus may include a 'turnaround' phase, or cycle. The turnaround cycle, in one embodiment, may be two system clock cycles in width, and may be initiated when the bus bridge is turning control of the bus over to a peripheral device, or when the peripheral device is returning control of the bus to the bus bridge. During a write cycle to the translation circuit, which may be implemented as a register in one embodiment, two turnaround cycles may occur. The first turnaround cycle may occur when a command is written to the register. At the beginning of the second turnaround cycle, as control of the bus is returned to the bus bridge, the switch may close, thereby electrically coupling the bus to the peripheral interface in the docking station.

Once the bus switch has been closed, the portable computer may begin operations with the docking station (item 212). More particularly, the bus may be used to communicate with peripherals in the portable computer and peripherals in the docking station. Thus, the portable computer may utilize extra functionality provided by the docking station.

Figure 4:
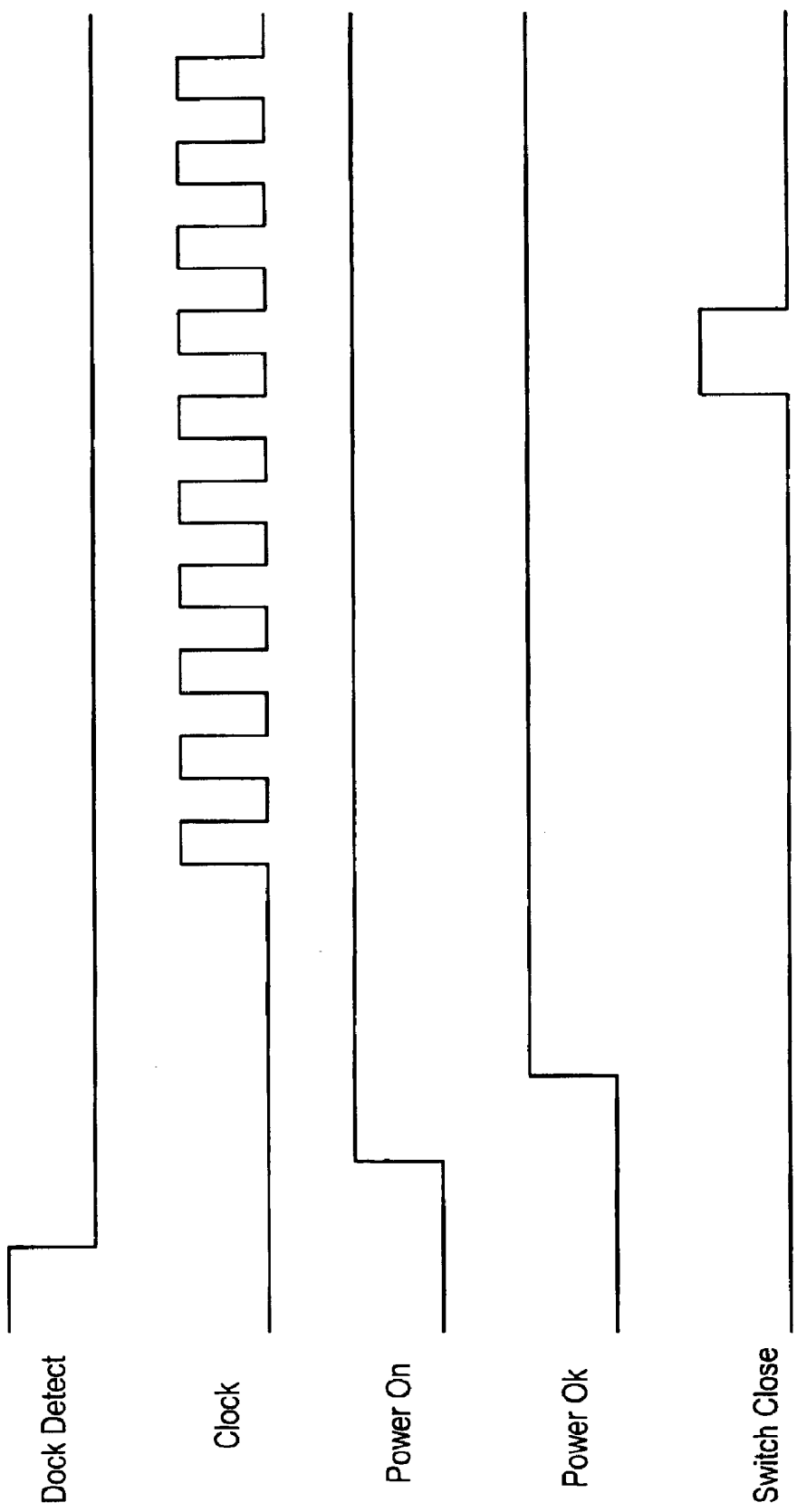
FIG. 4 is a timing diagram illustrating a sequence of events for one embodiment of a portable computer system configured for hot-docking.

FIG. 4 is a timing diagram for illustrating a sequence of events for one embodiment of a portable computer system configured for hot-docking with a docking station. The embodiment shown is an exemplary embodiment, and other embodiments are possible and contemplated. Other embodiments may include additional signals not shown here, and may not include some of the signals that are shown here. Furthermore, the states of assertion (logic high or logic low) may be different for various embodiments.

In the embodiment shown, the docking procedure begins when a portable computer is coupled to a docking interface. When the portable computer is coupled to the docking interface, a dock detect signal may be asserted. The dock detect signal is asserted low for this embodiment, although it may be asserted high in other embodiments. The dock detect signal may be received by the portable computer, which may then initiate communications with the docking station. Initiating communications may include asserting a power-on signal, as shown in the diagram, which indicate that the docking station is receiving power. The docking station may receive power from the portable computer itself, or from another external source.

Following the initial indication that the docking station is receiving power, a power ok signal may be asserted. The power ok signal may be used to indicate that the power received by the docking station meets both voltage and current specifications. Other specifications, such as a specification for voltage supply ripple, may also need to be met in order for the power ok signal to be asserted.

Once the power ok signal has been asserted, the portable computer system may begin driving a clock signal to the docking station. The clock signal may be necessary in order to initialize the switched portion of the bus, as well as for synchronizing operations between the portable computer and the docking station. The clock signal may be allowed to transition for several cycles in order to ensure its stability, as well as proper frequency and amplitude. Once the clock signal has transitioned for a sufficient number of cycles a 'switch close' command or pulse may be asserted, causing the bus switch to close. Following the closing of the bus switch, the portable computer can initiate bus communications with the docking station.

It should be noted that the timing for opening the bus switch may be similar or identical. The switch may be opened prior to undocking the portable computer from the docking station.

Figure 5:
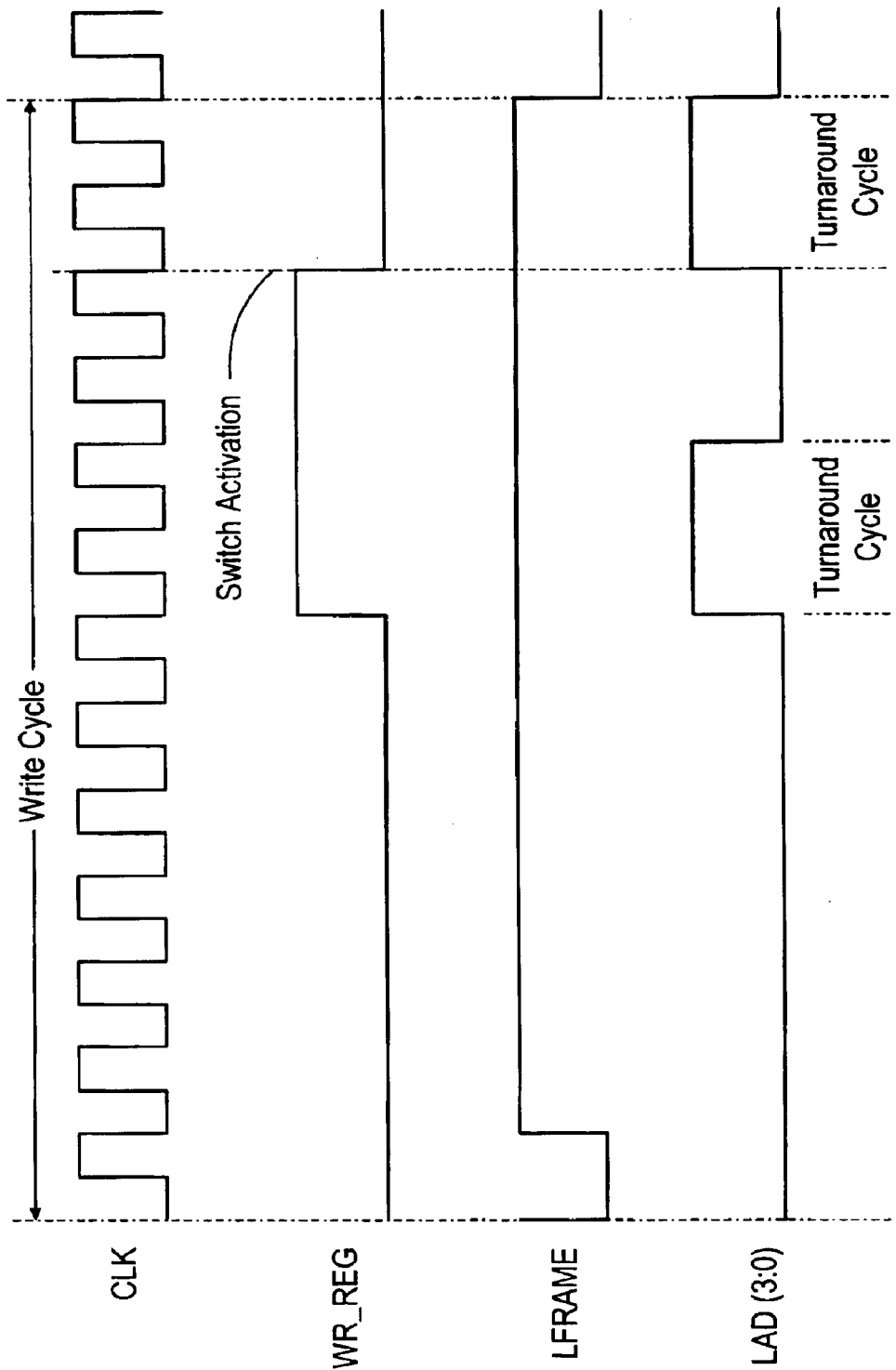
FIG. 5 is a timing diagram illustrating a sequence of events for another embodiment of a portable computer system configured for hot-docking, wherein the bus is a low pin count (LPC) bus.

Moving now to FIG. 5, a timing diagram illustrating a sequence of events for an embodiment of a portable computer system configured for hot-docking, wherein the bus is a low pin count (LPC) bus is shown. In the embodiments shown, a write cycle begins when the LFRAME signal is driven low. Data and/or address information may then be driven over signal lines corresponding to LAD(3:0). Although the signals driven over LAD(3:0) are shown driven low, signals may be either logic high or logic low depending on the information driven. The low state of the signals is shown here for sake of simplicity. After several clock cycles, a WR_REG command is asserted, indicating a command to write to a register, which may be the translation circuit in this embodiment. At approximately the same time, the signal lines corresponding to LAD(3:0) are driven high, indicating the beginning of a turnaround cycle. The turnaround cycle may last for approximately two clock cycles before the signal lines are driven low again. Approximately two more clock cycles may elapse before the signal lines are driven high again. Following the first turnaround cycle, the register or translation circuit may gain control of the LPC bus. As a second turnaround signal begins, the WR_REG command may be de-asserted. At this point, a command may be executed, thereby activating the switch. If the switch is open, the activation of the switch may cause it to close, thereby coupling the LPC bus to a peripheral interface in a docking station via the switched bus. The second turnaround cycle may last for approximately two clock cycles. Following the second turnaround cycle, a bus bridge may regain control of the LPC bus.

Undocking the portable computer from the docking station may require that the bus switch be open. In one embodiment, a user of the portable computer may initiate undocking procedures through a user interface. Following the initiation of undocking procedures, the events leading to the opening of the bus switch, and the corresponding timing, may be similar or identical to that which occurs when closing the switch.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A portable computer system, comprising:
   a bus bridge;
   a bus coupled to the bus bridge;
   one or more devices coupled to the bus;
   a docking interface coupled to the bus, wherein the docking interface includes a bus switch for coupling the bus to a peripheral interface in a docking station; and
   a docking connector coupled to the docking interface;
   wherein the docking connector is configured for docking the portable computer system to a docking station, and wherein the bus switch is configured to electrically couple the bus to the peripheral interface in the docking station responsive to said docking, and wherein the bus switch is closed during a predetermined turnaround cycle without suspending operations on the bus; and
   wherein the predetermined turnaround cycle is initiated by asserting a command.

2. The computer system as recited in claim 1, wherein the bus is a low pin count (LPC) bus.

3. The computer system as recited in claim 1, wherein the bus switch is a low on-resistance bi-directional switch.

4. The computer system as recited in claim 1, wherein the computer system is configured to drive a clock signal to the peripheral interface in the docking station.

5. The computer system as recited in claim 1, wherein the docking interface includes a translation circuit, wherein the translation circuit is configured to receive commands from the bus.

6. The computer system as recited in claim 5, wherein the translation circuit is configured to translate commands received from the bus in order to operate the bus switch.

7. The computer system as recited in claim 6, wherein the commands are write commands.

8. The computer system as recited in claim 1, wherein the docking interface is configured to receive a dock detect signal, and wherein the dock detect signal, when asserted, indicates that the computer is coupled to the docking station.

9. The computer system as recited in claim 8, wherein a transition of the dock detect signal from an asserted state to a de-asserted state indicates that the computer has been undocked from the docking station.

10. The computer system as recited in claim 8, wherein a transition of the dock detect signal from a de-asserted state to an asserted state indicates that said docking has occurred.

11. The computer system as recited in claim 1, wherein the portable computer is configured to initiate a power-up sequence in the docking station responsive to said docking.

12. The computer system as recited in claim 1, wherein the computer system is configured to initiate a power-down sequence in the docking station prior to un-docking the computer system.

13. The portable computer system of claim 1, wherein asserting a command comprises asserting a command to a register.

14. The portable computer system of claim 13, wherein the register is a translation circuit.

15. The portable computer system of claim 1, wherein the command includes a write cycle.

16. The portable computer system of claim 1, wherein closing the bus switch during the predetermined turnaround cycle comprises initiating a first turnaround cycle, asserting the command, initiating a second turnaround cycle, and de-asserting the command, wherein the bus switch is closed simultaneously with the initiating the second turnaround cycle.

17. A method for hot docking a portable computer system to a docking station, the method comprising:
   physically coupling the portable computer to a docking station, wherein the portable computer includes:
      a bus bridge;
      a bus coupled to the bus bridge;
      one or more devices coupled to the bus; and
      a docking interface coupled to the bus, wherein the docking interface includes a bus switch for coupling the bus to a peripheral interface in a docking station;
   asserting a dock detect signal in response to said physically coupling the portable computer to the docking station, wherein the dock detect signal is received by the docking interface; and
   electrically coupling the bus to the peripheral interface in the docking station, wherein said coupling comprises:
      closing the bus switch during a predetermined turnaround cycle; and
      initiating the predetermined turnaround cycle by asserting a command;
   wherein operations on the bus are not suspended during said docking; and
   wherein said asserting the dock detect signal is performed by one of:
      the portable computer; and
      the docking station.

18. The method as recited in claim 17, wherein the bus is a low pin count (LPC) bus.

19. The method as recited in claim 17, wherein the bus switch is a low on-resistance bi-directional switch.

20. The method as recited in claim 17 further comprising driving a clock signal to the docking station responsive to said hot docking.

21. The method as recited in claim 17 further comprising initiating a power-up sequence in the docking station responsive to said hot-docking.

22. The method as recited in claim 17, wherein said asserting the dock detect signal is indicative of said physical coupling.

23. The method as recited in claim 17, wherein the docking interface includes a translation circuit, wherein the translation circuit is configured to translate commands received from the bus bridge in order to operate the bus switch.

24. The method as recited in claim 23, wherein the commands are write commands.

25. The method of claim 17, wherein closing the bus switch during the predetermined turnaround cycle comprises:
   initiating a first turnaround cycle;
   asserting the command;
   initiating a second turnaround cycle; and
   de-asserting the command, wherein the bus switch is closed simultaneously with the initiating the second turnaround cycle.

26. The method of claim 25, wherein asserting the command comprises asserting the command to a register.

27. The method of claim 26, wherein the register is a translation circuit.

28. The method of claim 25, wherein the command includes a write cycle.

29. A docking interface chip configured for use in a portable computer, the portable computer configured for docking to a docking station, the docking interface chip comprising:
   a bus switch, wherein the bus switch is configured to, when closed couple a bus in a portable computer system to a switched bus in a docking station; and
   a switch control circuit coupled to the bus switch;
   wherein the switch control circuit is configured to close the switch responsive to a docking of the portable computer to the docking station and during a predetermined turnaround cycle, and wherein the switch control circuit is configured without suspending operations on the bus; and
   wherein the predetermined turnaround cycle is initiated by asserting a command.

30. The docking interface chip as recited in claim 29, wherein the bus is a low pin count (LPC) bus.

31. The docking interface chip as recited in claim 29, wherein the docking interface chip is configured to receive a dock detect signal, wherein the dock detect signal is asserted responsive to docking the portable computer to the docking station.

32. The docking interface chip as recited in claim 31, wherein a de-assertion of the dock detect signal indicates that the portable computer has be undocked from the docking station.

33. The docking interface chip as recited in claim 29, wherein the switch control circuit includes a translation circuit, wherein the translation circuit is configured to receive commands from the bus.

34. The docking interface chip as recited in claim 33, wherein the switch control circuit is configured to operate the bus switch responsive to the translation circuit receiving commands from the bus.

35. The docking interface chip as recited in claim 34, wherein the commands are write commands.

36. The docking interface chip as recited in claim 29, wherein the bus switch is a low on-resistance bi-directional switch.

37. The docking interface chip of claim 29, wherein closing the bus switch during the predetermined turnaround cycle comprises initiating a first turnaround cycle, asserting the command, initiating a second turnaround cycle, and de-asserting the command, wherein the bus switch is closed simultaneously with the initiating the second turnaround cycle.

38. A system comprising:
a portable computer, wherein the portable computer includes:
a bus bridge;
a bus coupled to the bus bridge;
one or more devices coupled to the bus;
a docking interface coupled to the bus, wherein the docking interface includes a bus switch; and
a docking connector electrically coupled to the docking interface;
a docking station, wherein the docking station includes:
a complementary connector, wherein the complementary connector is configured to be coupled to the docking connector;
a peripheral interface chip, wherein the peripheral interface chip is configured to be coupled to the bus through the complementary connector, the docking connector, and the bus switch;
wherein the portable computer is configured to be coupled to the docking station by coupling the docking connector to the complementary connector, wherein the bus switch is configured to close and electrically couple the bus to the peripheral interface responsive to coupling the portable computer to the docking station, wherein the switch is closed during a predetermined turnaround cycle without suspending operations on the bus; and
wherein the predetermined turnaround cycle is initiated by asserting a command.

39. The system as recited in claim 38, wherein the bus is a low pin count (LPC) bus.

40. The system as recited in claim 38, wherein the docking interface chip is configured to receive a dock detect signal, wherein the dock detect signal is asserted responsive to coupling the docking connector to the complementary connector.

41. The system as recited in claim 40, wherein the dock detect signal is de-asserted responsive to uncoupling the portable computer from the docking station.

42. The system as recited in claim 40, wherein the docking interface includes a switch control circuit, wherein the switch control circuit is configured to operate the bus switch.

43. The system as recited in claim 42, wherein the switch control circuit includes a translation circuit, wherein the translation circuit is configured to receive and translate commands for operating the bus switch.

44. The system as recited in claim 38, wherein the bus switch is a low on-resistance bi-directional switch.

45. The system as recited in claim 38, wherein a power-up sequence is initiated in the docking station responsive to coupling the portable computer to the docking station.

46. The system as recited in claim 38, wherein the portable computer includes a clock driver chip, wherein the clock driver chip includes a plurality of outputs for driving clock signals.

47. The system as recited in claim 46, wherein the clock driver chip is configured to drive a clock signal to the docking station responsive to coupling the portable computer to the docking station.

48. The system of claim 38, wherein asserting the command comprises asserting the command to a register.

49. The system of claim 48, wherein the register is a translation circuit.

50. The system of claim 38, wherein the command includes a write cycle.

51. The system of claim 38,
wherein closing the bus switch during the predetermined turnaround cycle comprises initiating a first turnaround cycle, asserting the command, initiating a second turnaround cycle, and de-asserting the command, wherein the bus switch is closed simultaneously with the initiating the second turnaround cycle.

52. A docking interface chip configured for use in a portable computer, the portable computer configured for docking to a docking station, the docking interface chip comprising:
a bus switch, wherein the bus switch is configured to couple a low pin count (LPC) bus in the portable computer to a peripheral interface in the docking station; and
a switch control circuit, wherein the switch control circuit includes a register, and wherein the bus switch is closed responsive to a command written to the register, wherein closing the switch includes initiating a first turnaround cycle, asserting the command, initiating a second turnaround cycle, and de-asserting the command, wherein the switch is closed simultaneously with said initiating the second turnaround cycle.

53. The docking interface chip as recited in claim 52, wherein the first turnaround cycle comprises a bus bridge granting control of the LPC bus to the switch control circuit.

54. The docking interface chip as recited in claim 53, wherein the second turnaround cycle comprises the bus bridge regaining control of the LPC bus.

55. A portable computer system comprising:
a bus bridge;
a bus coupled to the bus bridge;
one or more devices coupled to the bus;
a docking interface coupled to the bus, wherein the docking interface includes a bus switch for coupling the bus to a peripheral interface in a docking station; and
a docking connector coupled to the docking interface;
wherein the docking connector is configured for docking the portable computer system to a docking station, and wherein the bus switch is configured to electrically couple the bus to the peripheral interface in the docking station responsive to said docking, and wherein the bus switch is closed during a predetermined turnaround cycle without suspending operations on the bus; and
wherein closing the bus switch during the predetermined turnaround cycle comprises initiating a first turnaround cycle, asserting a command, initiating a second turnaround cycle, and de-asserting the command, wherein the bus switch is closed simultaneously with the initiating the second turnaround cycle.

56. The computer system as recited in claim 55, wherein the bus is a low pin count (LPC) bus.

57. The computer system as recited in claim 55, wherein the bus switch is a low on-resistance bi-directional switch.

58. The computer system as recited in claim 55, wherein the computer system is configured to drive a clock signal to the peripheral interface in the docking station.

59. The computer system as recited in claim 55, wherein the docking interface includes a translation circuit, wherein the translation circuit is configured to receive commands from the bus.

60. The computer system as recited in claim 59, wherein the translation circuit is configured to translate commands received from the bus in order to operate the bus switch.

61. The computer system as recited in claim 60, wherein the commands are write commands.

62. The computer system as recited in claim 55, wherein the docking interface is configured to receive a dock detect signal, and wherein the dock detect signal, when asserted, indicates that the computer is coupled to the docking station.

63. The computer system as recited in claim 62, wherein a transition of the dock detect signal from an asserted state to a de-asserted state indicates that the computer has been undocked from the docking station.

64. The computer system as recited in claim 62, wherein a transition of the dock detect signal from a de-asserted state to an asserted state indicates that said docking has occurred.

65. The computer system as recited in claim 55, wherein the portable computer is configured to initiate a power-up sequence in the docking station responsive to said docking.

66. The computer system as recited in claim 55, wherein the computer system is configured to initiate a power-down sequence in the docking station prior to un-docking the computer system.

67. A method for hot docking a portable computer system to a docking station, the method comprising:
   physically coupling the portable computer to a docking station, wherein the portable computer includes:
      a bus bridge;
      a bus coupled to the bus bridge;
      one or more devices coupled to the bus; and
      a docking interface coupled to the bus, wherein the docking interface includes a bus switch for coupling the bus to a peripheral interface in a docking station;
   asserting a dock detect signal, wherein the dock detect signal is received by the docking interface; and
   electrically coupling the bus to the peripheral interface in the docking station,
   wherein said coupling comprises closing the bus switch during a predetermined turnaround cycle, and wherein operations on the bus are not suspended during said docking;
   wherein closing the bus switch during the predetermined turnaround cycle comprises:
      initiating a first turnaround cycle;
      asserting a command;
      initiating a second turnaround cycle; and
      de-asserting the command, wherein the bus switch is closed simultaneously with the initiating the second turnaround cycle; and
   wherein said asserting the dock detect signal is performed by one of:
      the portable computer; and
      the docking station.

68. The method as recited in claim 67, wherein the bus is a low pin count (LPC) bus.

69. The method as recited in claim 67, wherein the bus switch is a low on-resistance bi-directional switch.

70. The method as recited in claim 67, further comprising driving a clock signal to the docking station responsive to said hot docking.

71. The method as recited in claim 67, further comprising initiating a power-up sequence in the docking station responsive to said hot-docking.

72. The method as recited in claim 67, wherein said asserting the dock detect signal is indicative of said physical coupling.

73. The method as recited in claim 67, wherein the docking interface includes a translation circuit, wherein the translation circuit is configured to translate commands received from the bus bridge in order to operate the bus switch.

74. The method as recited in claim 73, wherein the commands are write commands.

75. A docking interface chip configured for use in a portable computer, the portable computer configured for docking to a docking station, the docking interface chip comprising:
   a bus switch, wherein the bus switch is configured to, when closed couple a bus in a portable computer system to a switched bus in a docking station; and
   a switch control circuit coupled to the bus switch;
   wherein the switch control circuit is configured to close the switch responsive to a docking of the portable computer to the docking station and during a predetermined turnaround cycle, and wherein the switch control circuit is configured without suspending operations on the bus; and
   wherein closing the bus switch during the predetermined turnaround cycle comprises initiating a first turnaround cycle, asserting a command, initiating a second turnaround cycle, and de-asserting the command, wherein the bus switch is closed simultaneously with the initiating the second turnaround cycle.

76. The docking interface chip as recited in claim 75, wherein the bus is a low pin count (LPC) bus.

77. The docking interface chip as recited in claim 75, wherein the docking interface chip is configured to receive a dock detect signal, wherein the dock detect signal is asserted responsive to docking the portable computer to the docking station.

78. The docking interface chip as recited in claim 77, wherein a de-assertion of the dock detect signal indicates that the portable computer has be undocked from the docking station.

79. The docking interface chip as recited in claim 75, wherein the switch control circuit includes a translation circuit, wherein the translation circuit is configured to receive commands from the bus.

80. The docking interface chip as recited in claim 79, wherein the switch control circuit is configured to operate the bus switch responsive to the translation circuit receiving commands from the bus.

81. The docking interface chip as recited in claim 80, wherein the commands are write commands.

82. The docking interface chip as recited in claim 75, wherein the bus switch is a low on-resistance bi-directional switch.

83. A system comprising:
   a portable computer, wherein the portable computer includes:
      a bus bridge;
      a bus coupled to the bus bridge;
      one or more devices coupled to the bus;
      a docking interface coupled to the bus, wherein the docking interface includes a bus switch; and
      a docking connector electrically coupled to the docking interface;
   a docking station, wherein the docking station includes:
      a complementary connector, wherein the complementary connector is configured to be coupled to the docking connector;

a peripheral interface chip, wherein the peripheral interface chip is configured to be coupled to the bus through the complementary connector, the docking connector, and the bus switch;

wherein the portable computer is configured to be coupled to the docking station by coupling the docking connector to the complementary connector, wherein the bus switch is configured to close and electrically couple the bus to the peripheral interface responsive to coupling the portable computer to the docking station, wherein the switch is closed during a predetermined turnaround cycle without suspending operations on the bus; and wherein closing the bus switch during the predetermined turnaround cycle comprises initiating a first turnaround cycle, asserting a command, initiating a second turnaround cycle, and de-asserting the command, wherein the bus switch is closed simultaneously with the initiating the second turnaround cycle.

84. The system as recited in claim 83, wherein the bus is a low pin count (LPC) bus.

85. The system as recited in claim 83, wherein the docking interface chip is configured to receive a dock detect signal, wherein the dock detect signal is asserted responsive to coupling the docking connector to the complementary connector.

86. The system as recited in claim 85, wherein the dock detect signal is de-asserted responsive to uncoupling the portable computer from the docking station.

87. The system as recited in claim 85, wherein the docking interface includes a switch control circuit, wherein the switch control circuit is configured to operate the bus switch.

88. The system as recited in claim 87, wherein the switch control circuit includes a translation circuit, wherein the translation circuit is configured to receive and translate commands for operating the bus switch.

89. The system as recited in claim 83, wherein the bus switch is a low on-resistance bi-directional switch.

90. The system as recited in claim 83, wherein a power-up sequence is initiated in the docking station responsive to coupling the portable computer to the docking station.

91. The system as recited in claim 83, wherein the portable computer includes a clock driver chip, wherein the clock driver chip includes a plurality of outputs for driving clock signals.

92. The system as recited in claim 91, wherein the clock driver chip is configured to drive a clock signal to the docking station responsive to coupling the portable computer to the docking station.

* * * * *

UNITED STATES PATENT AND TRADEMARK OFFICE
CERTIFICATE OF CORRECTION

PATENT NO. : 6,868,468 B2
DATED : March 15, 2005
INVENTOR(S) : Boz et al.

It is certified that error appears in the above-identified patent and that said Letters Patent is hereby corrected as shown below:

Column 10,
Line 58, please delete "has be undocked" and substitute -- has been undocked --;

Column 14,
Line 39, please delete "has be undocked" and substitute -- has been undocked --.

Signed and Sealed this

Thirty-first Day of May, 2005

JON W. DUDAS
*Director of the United States Patent and Trademark Office*